(12) United States Patent
Fly et al.

(10) Patent No.: US 8,580,454 B2
(45) Date of Patent: Nov. 12, 2013

(54) COMBINED SUBGASKET AND MEMBRANE SUPPORT

(71) Applicant: GM Global Technology Operations LLC, Detroit, MI (US)

(72) Inventors: Gerald W. Fly, Ganeseo, NY (US); Yeh-Hung Lai, Webster, NY (US); Jeffrey A. Rock, Fairport, NY (US); Keith E. Newman, Athens, PA (US); Ping Liu, Irvine, CA (US); Alan J. Jacobsen, Pacific Palisades, CA (US); William B. Carter, Santa Monica, CA (US); Peter D. Brewer, Westlake Village, CA (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/756,641

(22) Filed: Feb. 1, 2013

(65) Prior Publication Data
US 2013/0202989 A1 Aug. 8, 2013

Related U.S. Application Data

(62) Division of application No. 12/341,105, filed on Dec. 22, 2008, now Pat. No. 8,389,177.

(51) Int. Cl.
*H01M 8/10* (2006.01)
*H01M 8/14* (2006.01)

(52) U.S. Cl.
USPC ........... 429/483; 429/475; 429/479; 429/492; 429/508; 429/517

(58) Field of Classification Search
USPC .......... 429/483, 475, 479, 492, 508, 511, 517
See application file for complete search history.

(56) References Cited

U.S. PATENT DOCUMENTS

| 6,156,449 | A | 12/2000 | Zuber et al. |
| 6,274,288 | B1 | 8/2001 | Kewitsch et al. |
| 7,382,959 | B1 | 6/2008 | Jacobsen |
| 2006/0240312 | A1* | 10/2006 | Xie et al. ......................... 429/42 |
| 2007/0148517 | A1* | 6/2007 | Merlo et al. ..................... 429/32 |

FOREIGN PATENT DOCUMENTS

WO   WO 97/40924   * 11/1997

OTHER PUBLICATIONS

Arnaud Bertsch, Paul Bernhard, Philippe Renaud; Microstereolithography: Concepts and Applications; 0-7803-7241-7/01 (c) 2011 IEEE.

Arnaud Bertsch, Sebastien Jiguet, Paul Bernhard, Philippe Renaud; Microstereolithography: A Review; Materials Research Society Symposium Proceedings, vol. 758, Boston, Massachusetts on Dec. 3-5, 2002, Rapid Prototyping Technologies; Swiss Federal Institute of Technology; (c) 2003 Material Research Society.

(Continued)

*Primary Examiner* — Milton I Cano
*Assistant Examiner* — Jeremiah Smith
(74) *Attorney, Agent, or Firm* — Fraser Clemens Martin & Miller LLC; J. Douglas Miller (57) ABSTRACT

A combined subgasket and membrane support for a fuel cell is provided. The combined subgasket and membrane support includes a substantially fluid impermeable feed region circumscribing a porous membrane support region. The membrane support region is integrally formed with the feed region. At least one of the membrane support region and the feed region is at least partially formed by a radiation-cured structure. A method for fabricating the subgasket and membrane support for the fuel cell is also provided.

13 Claims, 4 Drawing Sheets

(56) References Cited

OTHER PUBLICATIONS

C.R. Chatwin, M. Farsari, S. Huang, M.I. Heywood, R.C.D. Young, P.M. Birch, F. Claret-Tournier, J. D. Richardson; Characterization of Epoxy Resins for Microstereolithographic Rapid Prototyping; School of Engineering, University of Sussex, Falmer, Brighton, U.K.; (c) 1999 Springer-Verlag London Limited.

Hong-Bo Sun, Satoshi Kawata; Two-Photon Photopolymerization and 3D Lithographic Microfabrication; Department of Applied Physics, Osaka University, Japan; APS (2004) (c) Springer-Verlag 2004.

J. Stampfl, H. Houad, S. Seidler (Institute of Materials Science and Testing, Vienna University of Technology, Austria); R. Liska, F. Schwager (Institute of Applied Synthetic Chemistry, Vienna University of Technology, Austria); A. Woesz, P. Fratzl (Max Planck Institute of Colloids and Interfaces, Germany); Fabrication and Moulding of Cellular Materials by Rapid Prototyping; Int. J. Materials and Product Technology, vol. 21, No. 4, 2004, (c) Inderscience Enterprises Ltd.

Alan J. Jacobsen, William Barvosa-Carter, Steven Nutt; Compression Behavior of Micro-Scale Truss Structures Formed From Self-Propagating Polymer Waveguides; Acta Materialia 55 (2007) 6724-6733; Published by Elsevier Ltd.

* cited by examiner

COMBINED SUBGASKET AND MEMBRANE SUPPORT

CROSS-REFERENCE TO RELATED APPLICATION

This application is a divisional application of U.S. patent application Ser. No. 12/341,105, now U.S. Pat. No. 8,389,177, filed Dec. 22, 2008, hereby incorporated herein by reference in its entirety.

FIELD OF THE INVENTION

The present disclosure relates to a fuel cell and more particularly to a fuel cell subgasket manufactured by photopolymerization.

BACKGROUND OF THE INVENTION

A fuel cell has been proposed as a clean, efficient and environmentally responsible power source for electric vehicles and various other applications. Individual fuel cells can be stacked together in series to form a fuel cell stack. The fuel cell stack is capable of supplying a quantity of electricity sufficient to power a vehicle. In particular, the fuel cell stack has been identified as a potential alternative for the traditional internal-combustion engine used in modern automobiles.

One type of fuel cell is the polymer electrolyte membrane (PEM) fuel cell. The PEM fuel cell includes three basic components: an electrolyte membrane; and a pair of electrodes, including a cathode and an anode. The electrolyte membrane is sandwiched between the electrodes to form a membrane-electrode-assembly (MEA). The MEA is typically disposed between porous diffusion media (DM), such as carbon fiber paper, which facilitates a delivery of reactants such as hydrogen to the anode and oxygen, typically from air, to the cathode. In the electrochemical fuel cell reaction, the hydrogen is catalytically oxidized in the anode to generate free protons and electrons. The protons pass through the electrolyte to the cathode. The electrons from the anode cannot pass through the electrolyte membrane, and are instead directed as an electric current to the cathode through an electrical load, such as an electric motor. The protons react with the oxygen and the electrons in the cathode to generate water.

The electrolyte membrane is typically formed from a layer of ionomer. A typical ionomer is a perfluorosulfonic acid (PFSA) polymer, such as Nafion®, commercially available from the E. I. du Pont de Nemours and Company. The electrodes of the fuel cell are generally formed from a finely divided catalyst. The catalyst may be any electro-catalyst which catalytically supports at least one of an oxidation of hydrogen and a reduction of oxygen for the fuel cell electrochemical reaction. The catalyst is typically a precious metal such as platinum or another platinum-group metal. The catalyst is generally disposed on a carbon support, such as carbon black particles, and is dispersed in an ionomer.

The electrolyte membrane, electrodes, and DM are disposed between a pair of fuel cell plates and sealed, for example, with a gasket providing a substantially fluid-tight seal. The electrolyte membrane also typically has a barrier film or subgasket coupled thereto to provide internal reinforcement and to separate the hydrogen gas and the air supplied to the fuel cell stack. The subgasket generally overlays an edge of the electrolyte membrane and is formed in a secondary operation by cutting a piece of polymeric sheet material and bonding the sheet material to the electrolyte membrane with at least one of compression and an adhesive.

Typical subgaskets and means for coupling subgaskets to the electrolyte membrane are described in Assignee's copending U.S. application Ser. No. 11/972,211, the entirety of which is hereby incorporated herein by reference. However, ensuring proper alignment of the polymeric sheet material forming the subgasket with the electrolyte membrane is known to be difficult. Excess polymeric sheet material formed during formation of the subgasket also cannot be reused, resulting in an undesirable waste of material. The overlaying of the subgasket at the edge of the electrolyte membrane can further create an undesirable stress riser within the fuel cell stack.

There is a continuing need for a subgasket and a method for fabricating a subgasket that minimizes production waste, is cost-effective, and facilitates an alignment of the electrolyte membrane and subgasket within the fuel cell. Desirably, the subgasket is mechanically stable and militates against a formation of stress risers within the fuel cell at the junction between the subgasket and the electrolyte membrane.

SUMMARY OF THE INVENTION

In concordance with the instant disclosure, a membrane electrode assembly and a method for fabricating a membrane electrode assembly that minimizes production waste, is cost-effective, facilitates an alignment of the electrolyte membrane and subgasket within the fuel cell, is mechanically stable, and militates against a formation of stress risers within the fuel cell at the junction between the subgasket and the electrolyte membrane, is surprisingly discovered.

In a first embodiment, a membrane electrode assembly for a fuel cell includes a substantially fluid impermeable feed region circumscribing a porous membrane support region. At least one of the feed region and the membrane support region is formed at least partially by a radiation-cured structure.

In another embodiment, a fuel cell includes the membrane electrode assembly. The membrane support region is imbibed with an ionomer to form an electrolyte membrane. A pair of electrodes is disposed on opposing sides of the electrolyte membrane. The fuel cell includes a pair of gas diffusion media. Each of the gas diffusion media is disposed on one of the electrodes. The subgasket, electrolyte membrane, electrodes, and gas diffusion media are disposed between a pair of electrically conductive fuel cell plates.

In a further embodiment, method for fabricating a membrane electrode assembly for a fuel cell includes the steps of: providing a volume of radiation-sensitive material and at least one radiation source; placing a first mask between the at least one radiation source and the radiation-sensitive material, the first mask having at least one aperture; exposing the radiation-sensitive material to a plurality of radiation beams to form a membrane support region with a porous radiation-cured structure and a feed region circumscribing the membrane support region; and removing an uncured volume of the radiation-sensitive material from the membrane electrode assembly.

DRAWINGS

The above, as well as other advantages of the present disclosure, will become readily apparent to those skilled in the art from the following detailed description, particularly when considered in the light of the drawings described herein.

DETAILED DESCRIPTION OF THE INVENTION

The following detailed description and appended drawings describe and illustrate various embodiments of the invention. The description and drawings serve to enable one skilled in the art to make and use the invention, and are not intended to limit the scope of the invention in any manner. In respect of the methods disclosed, the steps presented are exemplary in nature, and thus, are not necessary or critical.

Figure 1:
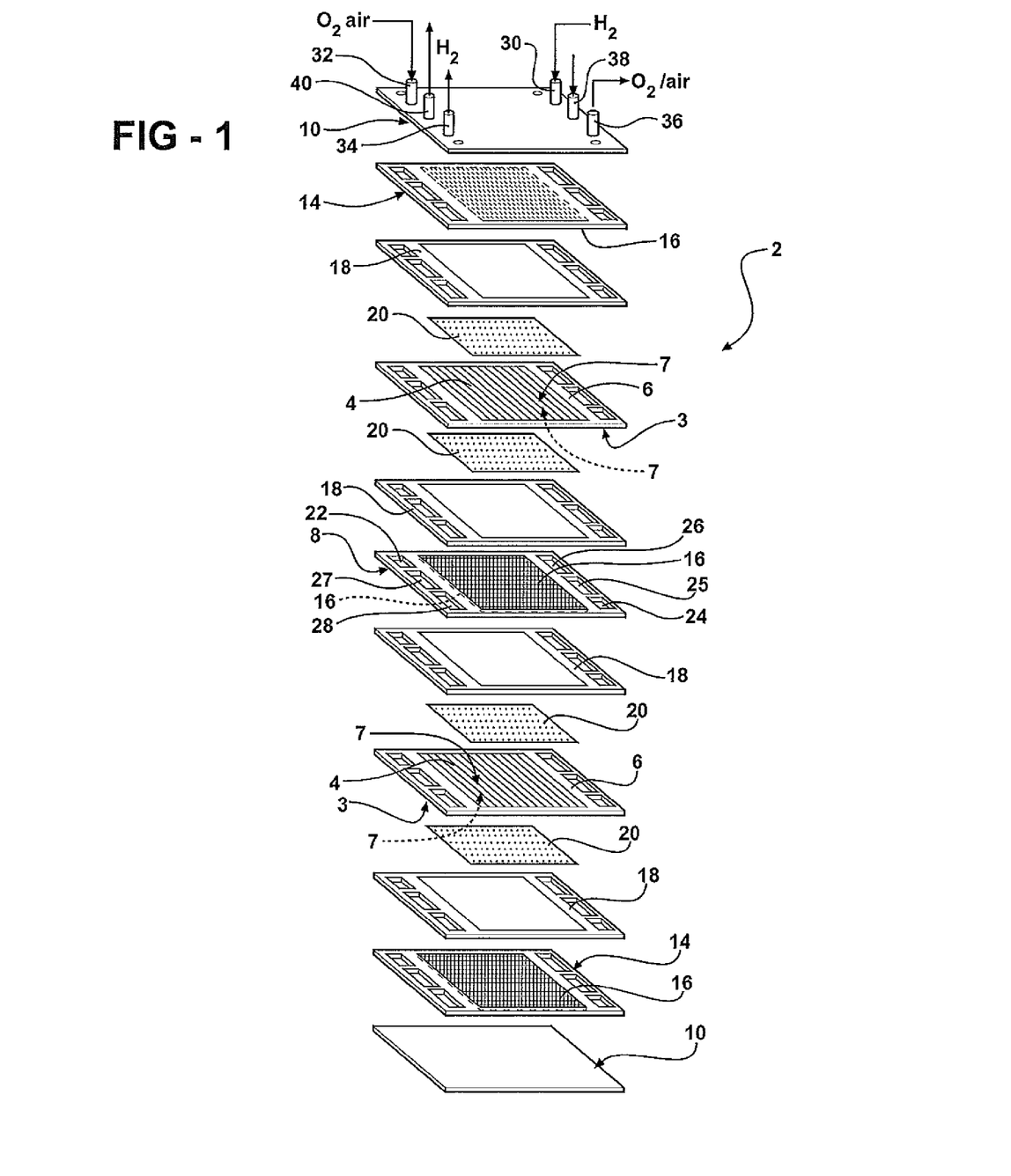
FIG. 1 illustrates a schematic, exploded perspective view of a PEM fuel cell stack with a combined subgasket and membrane support according to the present disclosure, showing only two cells.

FIG. 1 depicts a PEM fuel cell stack 2 according to the present disclosure. For simplicity, only a two-cell stack (i.e. one bipolar plate) is illustrated and described in FIG. 1, it being understood that a typical fuel cell stack will have many more such cells and bipolar plates.

The fuel cell stack 2 includes at least one MEA 3 having a combined subgasket and membrane support. The at least one MEA 3 is formed from an electrolyte membrane 4 supported by a subgasket 6. The electrolyte membranes 4 are each sandwiched between a pair of electrodes 7. Although MEAs 3 of a catalyst coated membrane (CCM) design are shown for purpose of simplicity, it should be understood that the fuel cell stack 2 may employ a catalyst coated diffusion media (CCDM) design, if desired.

An electrically conductive bipolar plate 8 separates the MEAs 3. The electrolyte membranes 4, the electrodes 7, and the bipolar plate 8 are stacked together between a pair of clamping plates 10, and a pair of unipolar end plates 14. The clamping plates 10 are electrically insulated from the end plates 14, for example, by a gasket or a dielectric coating (not shown). The unipolar end plates 14 and the bipolar plate 8 include active areas 16 for distributing reactants, such as hydrogen gas and oxygen/air, to the electrodes 7. The bipolar plate 8 and the unipolar end plates 14 may further include a plurality of flow channels (not shown) configured to distribute the reactants to the electrodes 7.

The fuel cell stack 2 may include nonconductive gaskets 18 to provide seals and electrical insulation between the components of the fuel cell stack 2. If the subgaskets 6 sufficiently seal and electrically insulate the fuel cell stack 2, however, it should be appreciated that the gaskets 18 may not be employed, as desired. Porous gas diffusion media 20 such as carbon or graphite diffusion papers, for example, abut the electrodes 7 disposed adjacent the electrolyte membrane 4. The gas diffusion media 20 are disposed between the electrolyte membrane 4 and the bipolar plate 8, and between the electrolyte membrane 4 and the unipolar end plate 14.

The subgaskets 6, bipolar plate 8, unipolar end plates 14, and the gaskets 18 each include a cathode supply aperture 22 and a cathode exhaust aperture 24, a coolant supply aperture 25 and a coolant exhaust aperture 27, and an anode supply aperture 26 and an anode exhaust aperture 28. Supply manifolds and exhaust manifolds of the fuel cell stack 2 are formed by an alignment of the respective apertures 22, 24, 25, 26, 27, 28 in the subgaskets 6, bipolar plate 8, unipolar end plates 14, and the gaskets 18. Hydrogen gas is supplied to an anode supply manifold via an anode inlet conduit 30. The oxygen/air is supplied to a cathode supply manifold of the fuel cell stack 2 via a cathode inlet conduit 32. An anode outlet conduit 34 and a cathode outlet conduit 36 are also provided for an anode exhaust manifold and a cathode exhaust manifold, respectively. A coolant inlet conduit 38 is provided for supplying liquid coolant to a coolant supply manifold. A coolant outlet conduit 40 is provided for removing coolant from a coolant exhaust manifold. It should be understood that the configurations of the various inlets 30, 32, 38 and outlets 34, 36, 40 in FIG. 1 are for the purpose of illustration, and other configurations may be chosen as desired.

Figure 2:
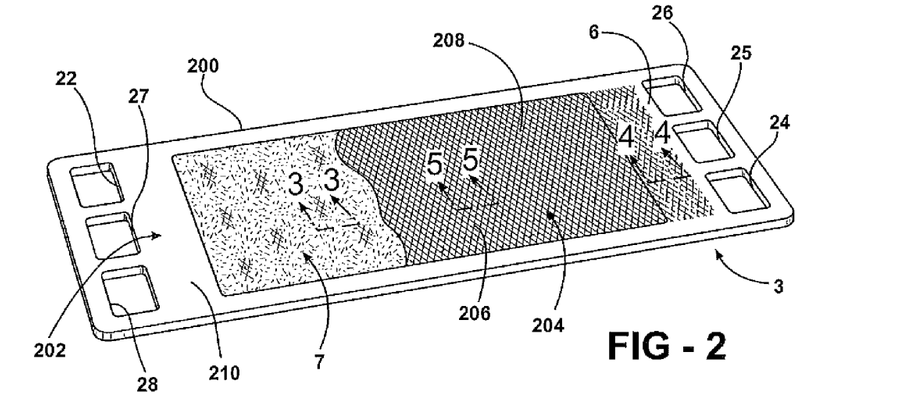
FIG. 2 is a schematic perspective view of the combined subgasket and membrane support depicted in FIG. 1, showing a partial electrode disposed thereon.

FIG. 2 shows the MEA 3 with the subgasket 6 according to the present disclosure. The MEA 4 includes a substantially fluid impermeable feed region 202 circumscribing a porous membrane support region 204. At least one of the feed region 202 and the membrane support region 204 is formed at least partially by a radiation-cured structure 206. The radiation-cured structure 206 of the present disclosure is formed from a radiation sensitive material as described, for example, in Assignee's co-pending U.S. patent application Ser. No. 12/339,308, the entire disclosure of which is hereby incorporated herein by reference.

The subgasket 6 may be formed from a sheet 200 having the feed region 202 and the membrane support region 204. The sheet may be a radiation-cured polymer or formed from another suitable material, as desired. The feed region 202 may be substantially fluid impermeable. The phrase "substantially fluid impermeable" is hereby defined to mean substantially impermeable to a flow of fluids from one side of the feed region 202 adjacent the first electrode 7 to the other side of the feed region 202 adjacent the second electrode 7. The membrane support region 204 is porous and integrally formed with the feed region 202. The membrane support region 204 may include the porous radiation-cured structure 206. The porous radiation-cured structure 206 may include at least one of a polymeric screen, such as a polymer pattern with a plurality of vertical holes formed therein, and a microtruss structure, for example. Other suitable porous, radiation-cured structures 206 may be employed as desired.

In another embodiment, the membrane support region 204 may be formed from a porous layer, such as an EPTFE layer, for example. Illustratively, the porous layer may be submerged in a liquid radiation-sensitive material, and the feed region 202 exposed to radiation to form the solid subgasket 6 from the resulting radiation-cured structure 206.

Figure 3:
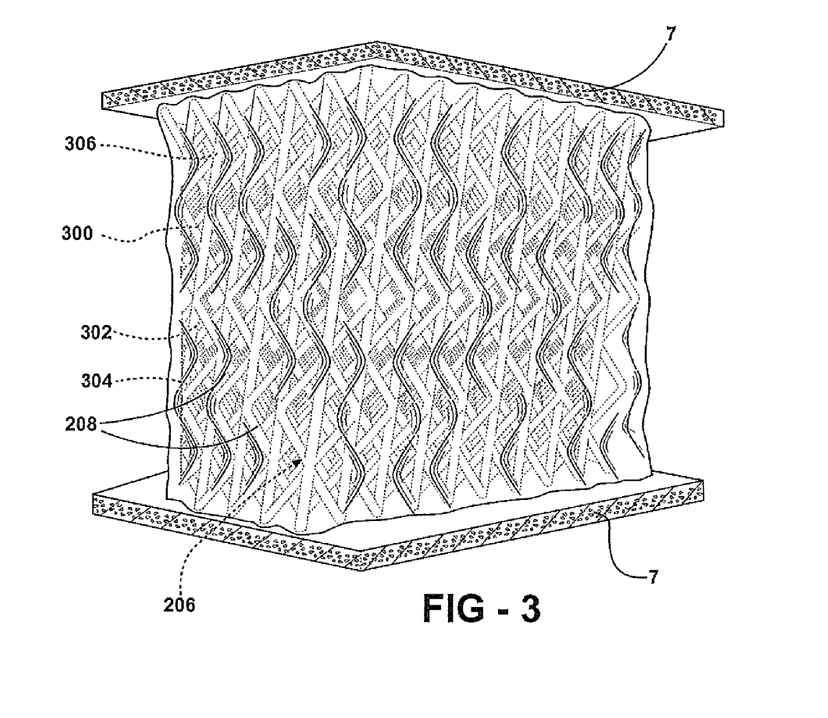
FIG. 3 is an enlarged fragmentary view of the membrane support depicted in FIGS. 1 and 2, showing a membrane support having a microtruss structure imbibed with an ionomer depicted generally by section line 3-3 in FIG. 2.

As more clearly shown in FIG. 3, the radiation-cured structure 206 of the membrane support region 204 may have the microtruss structure. The radiation-cured structure 206 may be imbibed with an ionomer 208 to form the electrolyte membrane 4. The ionomer 208 may be a perfluorosulfonic acid (PFSA) polymer, although other ionomer materials including hydrocarbon ionomers such as sulfonated polyetherketones, aryl ketones, and polybenzimidazoles may also be used. The electrodes 7 are disposed on opposing sides of the electrolyte membrane 4 supported by the membrane support region 204.

Figure 4:
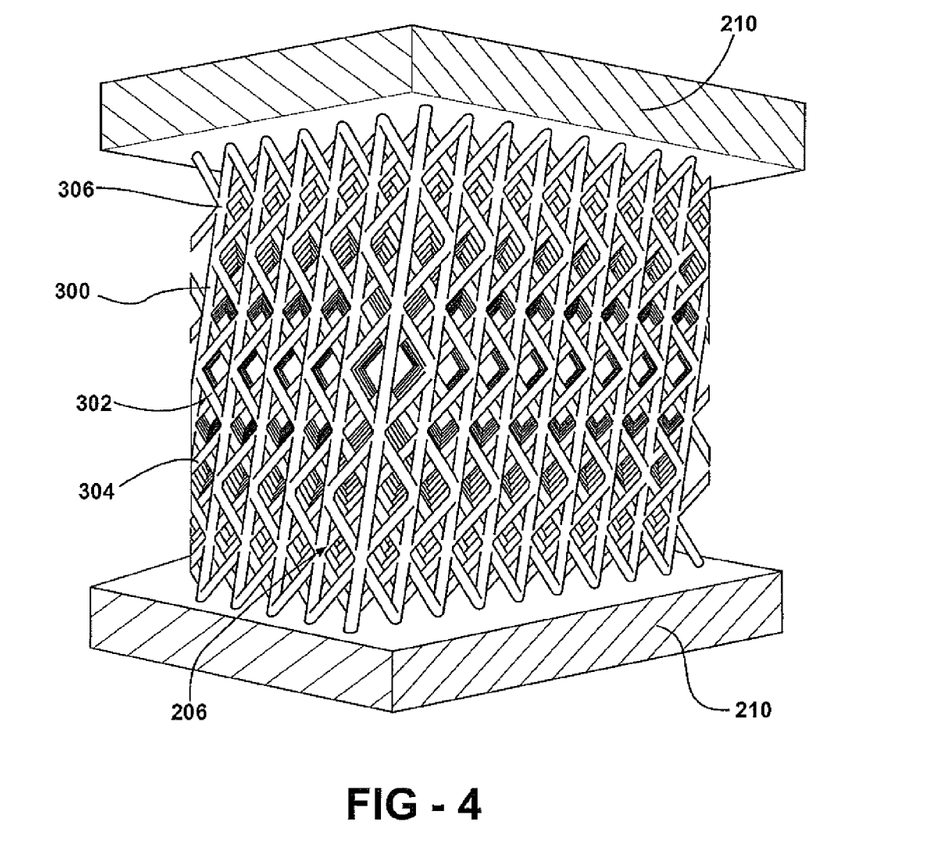
FIG. 4 is an enlarged fragmentary view of the subgasket depicted in FIGS. 1 and 2, showing a feed region with a plurality of internal ribs depicted generally by section line 4-4 in FIG. 2.

As shown in FIGS. 3 and 4, the radiation-cured structure 206 may include a plurality of first truss elements 300 extending along a first direction, a plurality of second truss elements 302 extending along a second direction, and a plurality of third truss elements 304 extending along a third direction. When formed from a liquid photomonomer, for example, the first, second, and third truss elements 300, 302, 304 may be defined by self-propagating polymer truss waveguides. The first, second, and third truss elements 300, 302, 304 interpenetrate each other at a plurality of nodes 306. It should be appreciated that the first, second, and third truss elements 300, 302, 304 may not interpenetrate each other, or may interpenetrate each other at the plurality of nodes 306 on an intermittent basis, as desired, to form the substantially continuous, three-dimensional self-supporting radiation-cured structure 206.

Although the microtruss structure with the plurality of first truss elements 300, the plurality of second truss elements 302, and the plurality of third truss elements 304 may have a 3-fold architectural symmetry as described hereinabove, a skilled artisan should appreciate that other architectures, such a 4-fold symmetry and 6-fold symmetry, may be employed within the scope of the present disclosure. The particular architecture may be selected, for example, to increase the microtruss structure connectivity and reduce susceptibility to bending and buckling of the microtruss structure 206 under a load. The selected architecture may be symmetrical or asymmetrical, as desired. The architecture may also be selected to optimize strength and stiffness of the microtruss structure. One of ordinary skill in the art should further understand that other architectures for microtruss structure may be employed, as desired Exemplary microtruss structures are described by Jacobsen et al. in "Compression behavior of micro-scale truss structures formed from self-propagating polymer waveguides", Acta Materialia 55, (2007) 6724-6733, the entire disclosure of which is hereby incorporated herein by reference. One method and system of creating ordered microtruss structures 206 is disclosed by Jacobsen in U.S. Pat. No. 7,382,959, the entire disclosure of which is hereby incorporated herein by reference. Microtruss structures produced by the method and system are further disclosed by Jacobsen in U.S. patent application Ser. No. 11/801,908, the entire disclosure of which is hereby incorporated herein by reference. Other suitable microstructures created by light exposure and resulting from a self-focusing or self-trapping of light by polymer waveguides is also described by Kewitsch et al. in U.S. Pat. No. 6,274,288, the entire disclosure of which is hereby incorporated herein by reference.

The feed region 202 of the subgasket 6 has the at least one supply aperture 22, 25, 26 and at least one exhaust aperture 24, 27, 28 formed therein. The feed region 202 is substantially fluid impermeable to militate against a crossover of the hydrogen and oxygen reactants supplied to the fuel cell stack 2. For example, the feed region 202 may be formed as a substantially solid, planar sheet 210 of radiation-cured material. In another embodiment shown in FIGS. 2 and 4, the radiation-cured structure 206 of the membrane support region 204 may extend into the feed region 202. In such instances, the radiation-cured structure 206 is disposed between a pair of the substantially solid, planar sheets 210 to form a hollow but substantially fluid impermeable feed region 202. The radiation-cured structure 206 may alternatively be disposed adjacent at least one substantially solid, planar sheet 210 to form the substantially fluid impermeable feed region 202. One of ordinary skill in the art should appreciate that the formation of the hollow feed region 202 may facilitate compression of the feed region 202 during operation of the fuel cell 2. The hollow feed region 202 may also provide bending strength sufficient to militate against an undesirable deformation of the feed region 202 into the flow channels formed in the nonactive regions of the bipolar plate 8 and unipolar plates 14, for example.

In certain illustrative embodiments, the polymer of the microtruss structure 206 within the hollow feed region 202 may be coated with a metal oxide or ceramic to provide the desirable level of bending strength. For example, ceramic radiation-cured structures 206 and methods for preparing ceramic radiation-cured structures 206 are disclosed by Gross et al in U.S. patent application Ser. No. 12/074,727, the entire disclosure of which is hereby incorporated herein by reference. Layers of metal, such as electroless nickel, for example, may be added to the pair of the substantially solid, planar sheets 210 to provide bending stiffness while still allowing compression. It should be further appreciated that the feed region 202 may include other structures between the pair of solid, planar sheets 210, such as internal ribs and similar radiation-cured structures, as desired. The radiation-cured structure 206 or other structures may fill the feed region 202 between the planar sheets 210, for example.

The subgasket 6 according to the present disclosure may be formed with a substantially constant thickness across a length thereof. In another embodiment, an average thickness of the membrane support region 204 may be less than an average thickness of the feed region 202. The lower thickness of the membrane support region 204 may facilitate the imbibing of the membrane support region 204 with the ionomer 208. It should be appreciated that the ionomer 208 may have a thickness greater than a thickness of the underlying membrane support region 204, as desired. In a further embodiment, a first area of the feed region 202 disposed adjacent the membrane support region 204 may have a first thickness that is substantially the same as an average thickness of the membrane support region 204. A stress riser typically associated with the junction of the electrolyte membrane 4 and the subgasket 6 is thereby militated against. A second area of the feed region 202 spaced apart from the membrane support region 204 may have a second thickness that is greater than the average thickness of the membrane support region 204. The thickness of the feed region 202 may gradually increase, for example, in the directions moving away from membrane support region 204. As a nonlimiting example, the feed region 202 may taper to the thickness of the membrane support region 204. The increase in thickness of the feed region 202 may also be intermittent or substantially constant, as desired. The greater thickness of the feed region 202 spaced apart from the membrane support region 204 may result in an optimized sealing of the fuel cell stack 2 when compressed during operation of the fuel cell stack 2.

Figure 5:
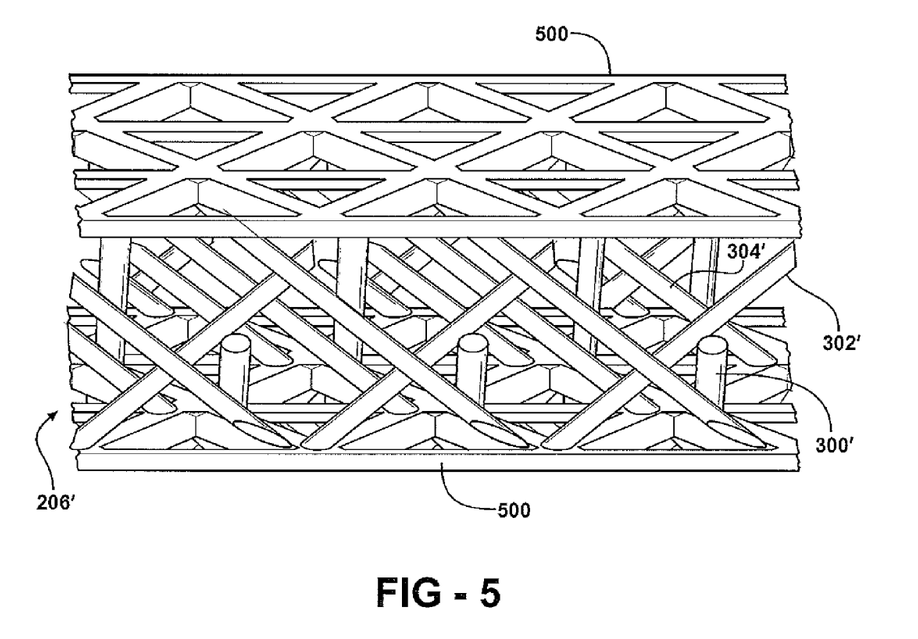
FIG. 5 is an enlarged fragmentary view of a radiation-cured structure formed between a pair of radiation-cured grids depicted generally by section line 5-5 in FIG. 2.

A further embodiment of the present disclosure is shown in FIG. 5. Like structure from FIGS. 1 to 4 have the same reference numeral and a prime (') symbol for purpose of clarity. The radiation-cured structure 206' may include the first, second, and third truss elements 300', 302', 304' without intersecting nodes 306. The radiation-cured structure 206' may also have a pair of radiation-cured grids 500 between which the radiation-cured structure 206' is formed. It should be appreciated that the radiation-cured structure 206' having the nonintersecting first, second, and third truss elements 300', 302', 304' may contributed to a desirable flexibility of the radiation-cured structure 206' in a direction perpendicular to the grids 500.

The present disclosure includes a method for fabricating the subgasket 6 with the membrane support region 204. The method first includes the steps of providing a volume of a radiation-sensitive material and at least one radiation source. The radiation-sensitive materials according to the present disclosure includes radiation-curable materials and radiation-dissociable materials. The term "radiation-curable material" is defined herein as any material that is at least one of initiated, polymerized, and crosslinked by exposure to radiation. It should be appreciated that an increase in temperature may also be employed to at least partially complete polymerization or crosslinking of the radiation-curable materials following an initiation by the exposure to radiation. The term "radiation-dissociable material" is defined herein as any material that exhibits at least one of a scissioning of the polymer backbone and a decrosslinking by exposure to radiation. As a nonlimiting example, the radiation-dissociable material may be made solvent-soluble by a sufficient breakage of crosslinks and/or scissioning of the polymer backbone of the radiation-dissociable material.

As nonlimiting examples, the radiation-curable materials may include one of a liquid photomonomer and a substantially solid radiation-curable polymer. The liquid photomonomer may be provided in a reservoir configured for the placement of a mask thereon. The liquid photomonomer may include monomers that polymerize via free-radical polymerization when exposed to UV radiation, for example, as described by Jacobsen in U.S. Pat. No. 7,382,959 and U.S. application Ser. No. 11/801,908, and a substantially solid radiation-sensitive polymer. The photomonomer may include any suitable free-radical photopolymer material such as urethanes (polyurethanes), acrylates, methacrylates, and cationic polymers such as photo-cured epoxies. Other suitable photomonomers may also be employed.

Suitable substantially solid radiation-curable polymers may include negative resist polymers. Negative resist polymers go through a photoinitiation process that leads to a curing of the negative resist polymer by polymerization or polycondensation, for example. Where the polymerization or polycondensation reaction occurs at substantially the same time, the process is referred to as "photocured". Where only the reaction species are generated by the photoinitiation process and a subsequent step such a heating is required to generate the polymerization or polycondensation, the process is be referred to as "photoinitiated". It should be appreciated that even though a post-cure heat treatment may be necessary to finalize the polymerization step, substantially stable radiation-cured features in the negative photoresist polymer may also be created during the initial radiation exposure. The substantially solid radiation-curable polymers can go through just the initiation process and, due to inherent stability and the limited diffusion rate of the chemical species within the solid radiation-curable polymers, the curing process may also be performed much later without significant feature degradation. It should be appreciated that most photoinitiated polymers begin the curing process at the inception of the initiation process, but the kinetics of the reaction at the exposure temperature are so slow that little, if any, polymerization or polycondensation may take place prior to heating the negative resist polymer to a desired curing temperature.

One particular negative resist polymer is the epoxy-based SU-8 2000™ negative resist polymer, commercially available from Microchem Corporation in Newton, Mass. The SU-8 2000™ negative resist polymer is curable by UV radiation. It should be appreciated that other substantially solid radiation-curable polymers may be employed. For example, similar to the photomonomers described above, the radiation-curable polymer selected may be cured with radiation of wavelengths other than UV radiation, as desired. The radiation-curable polymer may also be selected to have a slower cure rate than the liquid photomonomer, for example, to militate against features from appearing in the slower curing layer with exposure of the faster curing layer to a radiation source.

As a nonlimiting example, the radiation-dissociable materials may include positive resist polymers. Positive resist polymers begin as crosslinked polymers but may contain photoinitiators that, when exposed to a particular radiation, generate chemical species which dissociate the polymer by at least one of breaking the crosslinks and scissioning the polymer backbone. The dissociation makes the positive resist polymer soluble in the regions which have been exposed to the radiation. Regions where the positive resist polymer remains cured are masked rather than being exposed, as is the case with the negative resist polymers described hereinabove. In certain embodiments, the positive resist polymers are sensitive to radiation, e.g., ultraviolet or electron beam, without the need for photoinitiators. For example, the positive resist polymer may itself be damaged by the radiation and the remaining scissioned chains become soluble in a solvent. Other types of positive resist polymers may be employed, as desired.

The radiation employed to one of cure and dissociate the radiation-sensitive materials may include a UV beam from a Mercury arc lamp, for example. The radiation may be electromagnetic radiation or particle radiation, as desired. A skilled artisan understands that radiation of other wavelengths, such as infrared, visible light, and X-ray radiation, and from other sources, such as incandescent lights and lasers, may also be employed. Particle radiation such as an electron beam from a cathode ray source may also be employed. It should be further understood that the radiation may be collimated, partially collimated, or non-collimated, as desired.

The radiation is typically directed to the radiation-sensitive material via at least one mask having apertures or openings formed therein, through which the radiation may contact the radiation-sensitive material. The mask may be shaped to conform to a desired surface. The mask may extend along a single plane or multiple planes, as desired. For example, the mask may have multiple heights to form at least one of the feed region 202 and the membrane support region 204 with multiple thicknesses. In another example, the apertures may be substantially radiation-transparent apertures formed in an otherwise opaque or radiation-blocking material. In a particular embodiment, the mask may be formed from a plane of glass or a Mylar sheet, and facilitate the directing of radiation beams at an angle relative to either the mask or the underlying substrate. The mask may be lifted away after an exposure and cleaned for reuse. The apertures or openings formed in the mask have shapes that provide radiation beams to form polymer structures with a desired cross-sectional shape.

The method further includes the step of placing a first mask between the at least one radiation source and the radiation-sensitive material. The first mask may extend along a single plane and has at least one aperture through which the radiation from the radiation source may pass. The radiation-sensitive material is exposed to a plurality of radiation beams to form the membrane support region 204 with the radiation-cured structure 206. The radiation-sensitive material is also exposed to the plurality of radiation beams to form the feed region 202 circumscribing the membrane support region 204. A skilled artisan may select suitable mask materials, aperture and opening sizes and shapes, and resulting structural configurations, as desired.

The exposure to radiation may be conducted intermittently in a series of short exposures, for example, or in longer durations to provide the desired structural design. In one embodiment, the feed region 202 is fully exposed to the radiation except in those areas where the supply and exhaust apertures 22, 24, 25, 26, 27, 28 are desired to be formed. The full exposure to the radiation results in the substantially solid, fluid impermeable sheet 210 in the feed region 202. For example, the first mask may be configured to fully expose the surface of the feed region 202 and provide the substantially solid, planar sheet 210 in the feed region 202. The exposure duration may be selected to provide a desired thickness of the sheet 210. The desired thickness of the feed region 202 can also be varied by subsequent exposures or by using a mask that is varied in height, for example.

The membrane support region 204 may be exposed to the beams of radiation as described hereinabove to form the porous radiation-cured structure 206. For example, the radiation beams may include a first radiation beam, a second radiation beam, and a third radiation beam directed from the at least one radiation source toward the at least one aperture of the first mask. The first, second, and third radiation beams respectively form first, second and third waveguides of the polymer waveguides in a portion of the volume of the radiation-sensitive material. The first radiation beam is directed at a first angle with respect to the single plane, the second radiation beam is directed at a second angle with respect to the single plane, the second angle being different from the first angle, and the third radiation beam is directed at a third angle with respect to the single plane, the third angle being different from the first angle and the second angle. The first polymer truss element 300 forms a fourth angle with respect to the single plane, the fourth angle corresponding to the first angle, the second polymer truss element 302 forms a fifth angle with respect to the single plane, the fifth angle corresponding to the second angle, and the third polymer truss element 304 forms a sixth angle with respect to the single plane, the sixth angle corresponding to the third angle. The first, second and third polymer truss elements 300, 302, 304 intersect each other at the node 306 to form the radiation-cured structure 206.

The method further includes the step of removing an uncured volume of the radiation-sensitive material from the MEA 3 with the subgasket 6 following the fabrication thereof. It should be appreciated that the term "uncured radiation-sensitive material" may also include dissociated radiation-sensitive material within the scope of the present disclosure. If the radiation-sensitive material is the liquid photomonomer, the radiation-sensitive material may be drained and collected for reuse. The MEA 3 may be rinsed with a suitable solvent, for example, and the solvent drained to remove residual uncured radiation-sensitive material. Other methods for removing the uncured volume of the radiation-sensitive material from the subgasket 6 may also be employed.

In another embodiment, the radiation-cured structure 206 of the membrane support region 204 may be caused to extend into the feed region 202 as shown in FIG. 4. For example, the portion of the first mask with the plurality of apertures creating the polymer truss waveguides may extend over the feed region 202. It should be appreciated that at least a portion of the feed region 202 may be formed with the radiation-cured structure 206, as desired. If the radiation-cured structure 206 is caused to extend into the feed region 202, the method further includes the step of exposing the faces of the feed region 202 to a plurality of radiation beams to cause the feed region 202 to become substantially fluid impermeable. The exposure of the faces of the feed region 202 forms a pair of the substantially solid, planar sheets 210 on top of the radiation-cured structure 206. The microtruss structure 206 in the feed region 202 may thereby be disposed between the planar sheets 210, causing the feed region 202 to be substantially fluid impermeable.

The step of exposing the faces of the feed region 202 with the radiation-cured structure 206 interior may further include the step of placing at least a second mask between the at least one radiation source and the radiation-sensitive material after the step of exposing the radiation-sensitive material to the plurality of radiation beams to form the radiation-cured structure 206. The second mask has at least one aperture. The second mask may be placed adjacent each of the faces of the feed region 202 to fully expose the feed region to the radiation from the radiation source. The second mask may thereby be employed to form the pair of the planar sheets 210 sandwiching the radiation-cured structure 206 in the feed region 202 of the MEA 3.

The MEA 3 may be further processed to prepare the MEA 3 for assembly in the fuel cell stack 2. For example, the ionomer 208 may be applied to the membrane support region 204 to form an electrolyte membrane 4. The step of applying the ionomer 208 may include roll coating the ionomer 208, for example, in an in-line coating operation to imbibe the membrane support region 204 with the ionomer 208. The ionomer 208 may also be spread onto the membrane support region 204 and embedded into the membrane support region 204 by an application of pressure. The ionomer 208 may further be applied by spray coating to as desired thickness. In a further nonlimiting example, the ionomer 208 may be injected molded into the membrane support region 204. One of ordinary skill in the art may select other suitable methods for applying the ionomer 208 to the membrane support region 204, as desired.

With renewed reference to FIG. 4, it should be understood that the application of the ionomer 208 may also seal the hollow feed region 202, if the hollow feed region 202 is formed during fabrication of the MEA 3. The ionomer 208 may thereby facilitate the formation of the substantially fluid impermeable feed region 202 having the radiation-cured structure 206 in the interior thereof, for example. The substantially fluid impermeable feed region 202 militates against crossover leakage from one side of the active electrolyte membrane 4 to the other.

The electrodes 7 may also be applied to the faces of the electrolyte membrane 4 when applied to the MEA 3. For example, the method may include the step of coating the faces of the electrolyte membrane 4 with a catalyst ink, such as described in U.S. Pat. No. 6,156,449 to Zuber et al., the entire disclosure of which is hereby incorporated herein by reference. The step of coating the catalyst ink onto the electrolyte membrane 4 may include at least one of spraying, dipping, brushing, roller transfer, slot die coating, gravure coating, Meyer rod coating, and printing the catalyst ink onto the electrolyte membrane 4. It should be understood that the present method may equally include the step of coating the diffusion media 20 with the catalyst ink to form the electrodes 7, as desired.

The drying of the catalyst ink to form the electrodes 7 is generally conducted at an elevated temperature selected to drive off any solvent in the catalyst ink without thermally degrading any ionomer, carbon particles, and catalyst present in the catalyst ink composition. In a particular embodiment, the step of drying the catalyst ink includes drying the catalyst ink with an infrared drier. As a nonlimiting example, the catalyst ink may be dried at a temperature of about 300° F. for up to about 4 minutes. Other suitable drying temperatures, drying times, and means of drying the catalyst ink may also be employed.

It should be appreciated that by fabricating the subgasket 6 with the membrane support region 204, misalignment with the electrolyte membrane 4 and positioning variations are militated against. The subgasket 6 can also be formed with different thicknesses in different regions, without the wasted material that typically occurs in conventional fabrication processes. The cost of the subgasket 6 with the membrane support region 204 is limited to the material used in the fabrication and, in the case of liquid photomonomer, the bulk of the liquid photopolymer can be reused following fabrication of the subgasket 6. Design flexibility is also improved since the thicknesses of the membrane support region 4 and the various other regions of the MEA 3 can be readily selected, as desired. Furthermore, the integral formation of the membrane support region 204 with the subgasket 6 provides an inherent alignment of the electrolyte membrane 4 with the subgasket 6 when the membrane support region 204 is imbibed with the ionomer 208.

While certain representative embodiments and details have been shown for purposes of illustrating the invention, it will be apparent to those skilled in the art that various changes may be made without departing from the scope of the disclosure, which is further described in the following appended claims.

What is claimed is:

1. A method for fabricating a membrane electrode assembly for a fuel cell, the method comprising the steps of:
    providing a volume of radiation-sensitive material and at least one radiation source; placing a first mask between the at least one radiation source and the radiation-sensitive material, the first mask having at least one aperture;
    exposing the radiation-sensitive material to a plurality of radiation beams to form a membrane support region with a porous radiation-cured structure and a feed region circumscribing the membrane support region, wherein the membrane support region is formed at least partially by a microtruss structure comprising a substantially continuous, three-dimensional self-supporting radiation cured structure; and
    removing an uncured volume of the radiation-sensitive material from the membrane electrode assembly.

2. The method of claim 1, wherein the radiation-sensitive material is one of a liquid photomonomer and a substantially solid radiation-sensitive polymer.

3. The method of claim 1, wherein the feed region is substantially fluid impermeable.

4. The method of claim 1, wherein the radiation beams include a first radiation beam, a second radiation beam, and a third radiation beam directed from the at least one radiation source toward the at least one aperture to respectively form first, second and third polymer truss elements in a portion of the volume of the radiation-sensitive material, wherein the first radiation beam is directed at a first angle with respect to the single plane, the second radiation beam is directed at a second angle with respect to the single plane, the second angle being different from the first angle, the third radiation beam is directed at a third angle with respect to the single plane, the third angle being different from the first angle and the second angle, the first polymer truss element forms a fourth angle with respect to the single plane, the fourth angle corresponding to the first angle, the second polymer truss element forms a fifth angle with respect to the single plane, the fifth angle corresponding to the second angle, and the third polymer truss element forms a sixth angle with respect to the single plane, the sixth angle corresponding to the third angle, wherein the first, second and third polymer truss elements intersect each other to form a microtruss structure.

5. The method of claim 1, wherein the at least one aperture of the first mask provides a substantially solid, planar sheet in the feed region with at least one inlet aperture and at least one outlet aperture formed therein.

6. The method of claim 1, wherein the radiation-cured structure of the membrane support region is caused to extend into the feed region.

7. The method of claim 6, further comprising the step of placing a second mask between the at least one radiation source and the radiation-sensitive material after the step of exposing the radiation-sensitive material to the plurality of radiation beams to form the porous radiation-cured structure, the second mask having at least one aperture adjacent the feed region.

8. The method of claim 7, further comprising the step of exposing at least one of the faces of the feed region to a plurality of radiation beams to form at least one substantially solid, planar sheet, the porous radiation-cured structure of the feed region disposed adjacent thereto.

9. The method of claim 1, further comprising the step of applying an ionomer to the membrane support region to form an electrolyte membrane.

10. The method of claim 9, wherein the step of applying the ionomer seals the feed region.

11. The method of claim 9, further comprising the step of coating the faces of the electrolyte membrane with a catalyst ink.

12. The method of claim 11, further comprising the step of drying the catalyst ink to form a pair of electrodes on the electrolyte membrane.

13. The method of claim 12, wherein the step of drying the catalyst ink uses an infrared drier.

* * * * *